United States Patent [19]

Marechal et al.

[11] Patent Number: 4,957,696

[45] Date of Patent: Sep. 18, 1990

[54] FUEL ELEMENT ROD FOR A WATER-COOLED NUCLEAR REACTOR

[75] Inventors: Roger L. Marechal, Sainte Genevieve des Bois; Pierre Mauny, Jouy en Josas, both of France

[73] Assignee: Commissariat a l'Energie Atomique, France

[21] Appl. No.: 434,879

[22] Filed: Nov. 9, 1989

[30] Foreign Application Priority Data

Nov. 22, 1988 [FR] France ............................ 88 15155

[51] Int. Cl.$^5$ .............................................. G21C 3/00
[52] U.S. Cl. ..................................... 376/419; 376/418
[58] Field of Search ................ 376/419, 418, 420, 451

[56] References Cited

U.S. PATENT DOCUMENTS

| | | | |
|---|---|---|---|
| 3,899,392 | 8/1975 | Grossman | 376/419 |
| 4,609,524 | 9/1986 | Ferrari | 376/417 |
| 4,722,827 | 2/1988 | Kwon | 376/900 |

FOREIGN PATENT DOCUMENTS

| | | |
|---|---|---|
| 662424 | 8/1965 | Belgium . |
| 0137675 | 4/1985 | European Pat. Off. . |
| 2183893 | 6/1987 | United Kingdom . |

*Primary Examiner*—Donald P. Walsh

[57] ABSTRACT

Fuel element rod for a pressurized water-cooled nuclear reactor having a cylindrical can (2) made from an alloy which is transparent to neutrons and closed at each of its ends by a plug (3, 4), namely an upper plug (3) and a lower plug (4) and having a first portion in which are stacked fuel material pellets (6), which is optionally inserted between two insulating pellets (7, 8), and a second portion or expansion chamber (5) containing a compressed spring (9) bearing at one end on the upper plug (3) and at the other end on the stack of fuel pellets (6) which it maintains in position, characterized in that the spring is made from hafnium.

1 Claim, 1 Drawing Sheet

U.S. Patent
Sep. 18, 1990
4,957,696
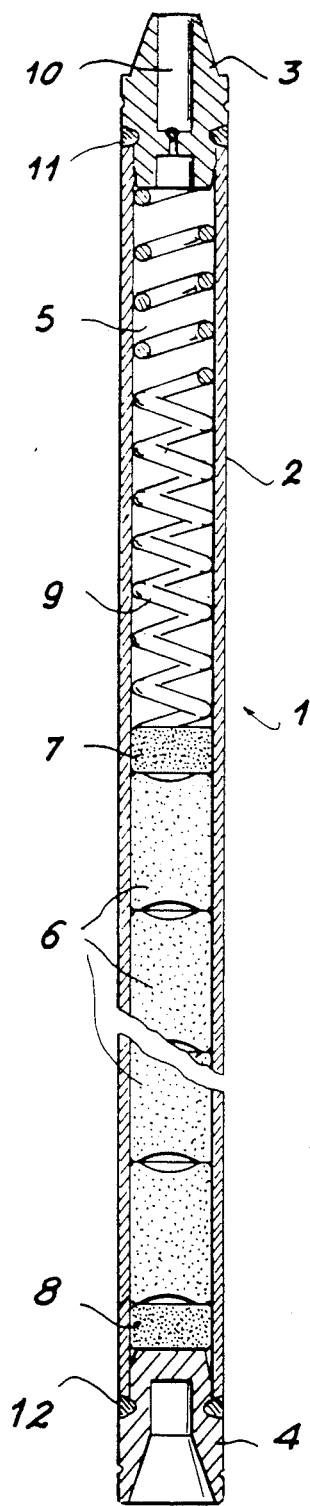

FUEL ELEMENT ROD FOR A WATER-COOLED NUCLEAR REACTOR

DESCRIPTION

The present invention relates to fuel elements for water-cooled nuclear reactors.

For such nuclear reactors, they nuclear industry designs and manufactures fuel in the form of rods, which are combined in the reactor into parallel bundles as assemblies and are maintained in place according to a regular system or pattern by structural elements. These bundles of rods are vertically positioned in the reactor.

In known manner, the fuel rods generally have a tubular metal sheath or can, which is most frequently made from zirconium alloy and which contains stacks of fissile material pellets, fritted uranium oxide, mixed uranium-plutonium oxide, or any other fissile material, which may or may not be doped with a consumable absorbent. They are stacked in the can in the axial direction thereof. The ends of the can are sealed by two zirconium alloy plugs, sealing being ensured by welding the plugs to the can ends.

The column of fuel pellets is maintained in place, particularly during transportation and the handling operations preceding the placing in the reactor of said assemblies, by a helical spring located within the upper part of the can and compressed between the upper pellet of the fuel column and the upper plug of the rod.

In pressurized ordinary water-cooled nuclear reactors, the outer surface of the can is in operation subjected to a pressure of close to 16 MPa, which is the pressure of the cooling fluid. In order to avoid any deformation of the rods, within the can and following its filling by the fuel pellets and its sealing by the tight plugs, a pressure of an inert gas which is a good heat conductor is maintained and this can be between 0.1 and 8 MPa.

This internal pressure, increased by the thermal expansion of the inert gas in operation and the release of fission gases gives the fuel rods an adequate mechanical stablity to limit the effects of the sinking of the sheath or can and its coming into contact with the fuel pellets. The recess of the spring, in the upper part of the fuel rod, constitutes the expansion chamber. The volume of the expansion chamber plays a vital part in regularizing the developments of the internal pressure of the fuel rod. At the same time this expansion chamber collects the fission gases escaping from the fuel during the development of the chain reaction during the operation of the reactor.

The spring, which is usually made from austenitic stainless steel, is designed so as to apply a force to the fuel stack able to compensate an acceleration of approximately 6 g. Its volume must be minimum, in order to leave the maximum free space in the expansion chamber. Due to the enlargement of the rods under irradiation, it is not possible to unduly increase the height of the expansion chamber.

A fuel rod must have a length below 1 m in the case of an experimental reactor and exceeding 4 m in certain power reactors.

For certain recent designs of nuclear reactors, a known improvement to these fuel rods consists of breaking them down into rods of limited length, or rod sections which are joined end to end. These rod sections constitute the same number of autonomous rods with their own fuel column, their spring, their expansion chamber and their upper and lower plugs.

This new arrangement can be advantageously utilized for producing axial coverings. The rod can e.g. have three sections, namely a long central section and two short end sections. Each rod is then individualized with regards to its contribution to the neutron reaction occurring in the reactor core. For example, the end sections can contain pellets with a different enrichment and the sections can be replaced during the life of the rod. In the same way, during reprocessing, the sections can be detached and separately treated, because they do not necessarily have the same starting enrichments and they have not been subject to the same flux.

It would also be possible to have combinations with a larger number of sections, namely for industrial purposes, or for experimental purposes.

Such a known fuel element rod section structure is shown in the single drawing attached. In the drawing it is possible to see the rod section 1 constituted by a zirconium alloy can 2, which is sealed at its two ends by a zirconium alloy plug, namely the upper plug 3 and the lower plug 4. Within the can 2 there are two compartments, namely in the upper part the expansion chamber 5 and in the lower part the fuel pellets 6. The stack of fuel pellets 6 is surrounded by two insulating pellets 7, 8 made from alumina, zirconia or hafnium. In certain cases, it may only be possible to use the lower pellet 8. The function of these pellets, which have thermal insulation and possibly neutron absorption properties, is to avoid an increase in temperature facing the ends of the fuel pellet column and consequently an over-heating of plug 4 and the end of spring 9. The expansion chamber 5 contains the compression spring 9 of the fuel pellet column 6, said spring 9 being compressed between the upper plug 3 and the insulating pellet 7 terminating the stack of pellets 6 in the upper part. It is also pointed out that the plugs 3 and 4 have complimentary shapes permitting the sequential insertion of several rod sections identical to that in the drawing and plug 3 has a recess 10 for receiving a neutron absorbing material in order to compensate the neutron flux peak, which will be referred to hereinafter. Finally, the plugs 3 and 4 are welded to the can 2 with the aid of weld beads 11 and 12.

Such a fuel rod structure suffers from serious disadvantages as a result of the neutron flux peaks appearing in the reactor core, in areas where there is a deficiency of absorbing atoms, i.e. at the location of the expansion chambers of the sections, other than the upper section, and at the intermediate plugs.

Thus, although the nuclear material produces the neutron-generating chain reaction, said material also absorbs neutrons and consequently a neutron equilibrium is established within said material. However, in expansion chambers, which are empty apart from the spring, the neutron flux is more intense than in the combustible material due to the absorption deficit. Thus, at the ends of the stacks, if special precautions are not taken, there are areas affected by a neutron flux peak leading to unacceptable hot points on the rod in question and the adjacent rods.

At the intermediate plugs 3 and 4 between the different sections, the solution of this neutron problem consists of using hafnium plugs. This matrial absorbs neutrons and can be adequately welded to zirconium alloys. The neutron absorption continuity can also be ensured by absorbing material inserts (hafnium or the like) fixed in the intermediate plugs. At the expansion chambers 5, the neutron absorption continuity is more difficult to obtain.

In previously carried out tests, experimentally attempts were made to obviate this obstacle by introducing in the vicinity, in the centre or around the spring, pellets or inserts made from an absorbent material, usually hafnium.

Unfortunately, these absorbing elements coexist with the spring and occupy a large proportion of the volume of the expansion chamber, e.g. up to 25%. Thus, the latter has to be elongated in order to maintain the volume necessary for the fission gases, which is to the detriment of the fuel column. In addition, these absorbing elements cannot in general be present over the entire height of the expansion chamber. They must leave a free space of 15 to 20 mm long for the longitudinal expansion of the fuel column when it is heated. This free space without absorbent obviously disturbs the neutron flux, in the same way as the expansion chamber without absorbent.

Thus, hitherto, the two problems consisting of maintaining the pellets in the rods, particularly during transportation, and the compensation of the lack of absorption of the neutrons in the expansion chamber, could only be solved by the simultaneous presence of two different means, namely a spring and an absorbent insert, with all the disadvantages mentioned hereinbefore caused by their spatial coexistence in the expansion chamber.

The present invention relates to a fuel element rod for a pressurized light water-cooled nuclear reactor, which solves the aforementioned problems in a particularly simple manner.

This fuel element rod is essentially characterized in that the spring located in the expansion chamber is used both for maintaining the pellets in place and for compensating the absorption of the neutrons in said expansion chamber and is made from hafnium.

Thus, the Applicant has unexpectedly found that the volume of the conventional steel springs is close to that of the hafnium necessary for producing in the expansion chamber the neutron absorption leading to a uniform distribution of the neutron flux. Thus, by optimizing the geometry of the spring, i.e. the diameter of the wire and the number of turns, the desired hafnium volume is precisely obtained.

Obviously, the Expert can use all known metallurgical treatments for ensuring that the hafnium constituting the spring has all the requisite elastic qualities. In particular, a particular metallurgical treatment of the hafnium, relating more especially to an optimization of the cold hammering level, linked optionally with the addition of appropriate elements increasing the yield stress, is able to give adequate mechanical properties to said metal in order to form the spring for maintaining the fuel pellets in the expansion chamber of a fuel element rod or rod section.

According to the present invention, calculations have shown that a hafnium spring occupying the entire height of the expansion chamber would make it possible to exert a force corresponding to that of an acceleration of 6 g on the fuel column, whilst only occupying 20% of the expansion chamber volume. This hafnium quantity and its distribution also make it possible to harmoniously level out the neutron flux.

Moreover, due to its high melting point, there is no danger of hafnium melting during the connection by welding of the upper plug to the can, or during the operation of the rod, even if slightly outside the standard values.

The hafnium spring according to the invention can be used both in the expansion chambers of rod sections located in the full flux of reactors and as a spring for the upper section. In this case, it serves as an absorbant for limiting the neutron flux on the upper parts of assemblies, thus limiting the deterioration or damage thereof.

In summarizing, the hafnium spring according to the invention used in a nuclear fuel rod has three advantages compared with known solutions, whilst maintaining the integrity of the first confinement barrier constituted by the rod can:

(1) whilst ensuring the continuity of the neutron absorption along the expansion chamber, it levels out the neutron flux and eliminates the peaks in said expansion chambers;

(2) when used in the upper part of a rod, it limits the upward neutron leaks of the assemblies;

(3) in the case of use in independent rod sections located in full flux, it avoids any undue increase in the height of the expansion chamber.

As a non-limitative example, hereinafter are given the characteristics of a rod section equipped with a hafnium spring according to the invention:

total length of rod section 527.5 mm;
fuel column length 444.75 mm;
internal diameter of can 8.36 mm;
external diameter of fuel pellets 8.19 mm;
expansion chamber height 46 mm.

In this particular example, the spring characteristics are as follows: material: nuclear quality hafnium;
wire diameter: 1.4 mm;
spring diameter: 7.7 mm;
number of turns: 22;
free spring length: 55 mm;
shear modulus value: 45000 MPa;
wire cold hammering level: 50%.

We claim:

1. Fuel element rod for pressurized water-cooled nuclear reactor, having a cylindrical can (2) made from an alloy transparent to neutrons and sealed at each of its ends by a plug (3, 4), namely upper plug (3) and lower plug (4), and having a first portion in which are stacked fuel material pellets (6) and a second portion or expansion chamber (5) containing a compressed spring (9) bearing at one end on the upper plug (3) and at the other end on the fuel pellet stack (6) which it maintains in position, characterized in that the spring is used both for maintaining in place the pellets and for compensating the absorption of the neutrons in said expansion chamber and it is made from hafnium.

* * * * *